United States Patent
Bennett

(10) Patent No.: US 9,193,587 B2
(45) Date of Patent: Nov. 24, 2015

(54) SYSTEM AND METHOD FOR WATER PURIFICATION AND DESALINATION

(75) Inventor: Rex Bennett, Haddon Township, NJ (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 498 days.

(21) Appl. No.: 13/548,539

(22) Filed: Jul. 13, 2012

(65) Prior Publication Data

US 2013/0015136 A1 Jan. 17, 2013

Related U.S. Application Data

(60) Provisional application No. 61/507,423, filed on Jul. 13, 2011.

(51) Int. Cl.
| | |
|---|---|
| *B01D 35/00* | (2006.01) |
| *B82Y 30/00* | (2011.01) |
| *C02F 1/44* | (2006.01) |
| *B01D 63/00* | (2006.01) |
| *C02F 1/00* | (2006.01) |

(52) U.S. Cl.
CPC . *B82Y 30/00* (2013.01); *C02F 1/44* (2013.01); *C02F 1/002* (2013.01)

(58) Field of Classification Search
CPC .... B01D 27/005; B01D 27/08; B01D 27/146; B01D 29/0004; B01D 29/0006; B01D 27/0093; B01D 29/0095; B01D 29/01; B01D 29/012; B01D 29/05; B01D 35/00; B01D 35/30; B01D 35/301; B01D 35/303; B01D 35/34; B01D 63/00; B01D 63/08; B01D 63/081; B01D 63/082; B01D 63/087; B01D 65/003; B01D 2201/30; B01D 2201/307; B01D 2201/31; B01D 2201/313; B01D 2201/32; B01D 2201/34
USPC .......... 210/256, 257.1, 257.2, 261, 259, 210/321.84, 435, 437, 438, 439, 473, 477, 210/479, 482, 500.21
See application file for complete search history.

(56) References Cited

U.S. PATENT DOCUMENTS

| | | | |
|---|---|---|---|
| 4,891,134 A | * | 1/1990 | Vcelka .......................... 210/359 |
| 5,425,858 A | | 6/1995 | Farmer |

(Continued)

FOREIGN PATENT DOCUMENTS

| | | |
|---|---|---|
| KR | 1020120022164 | 3/2012 |
| WO | WO 2012/006657 | 1/2012 |

(Continued)

OTHER PUBLICATIONS

Suk et al., 2010, J. Phys. Chem. Lett. 2010, 1, 1590-1594.*

(Continued)

*Primary Examiner* — Allison Fitzsimmons
(74) *Attorney, Agent, or Firm* — Lathrop & Gage LLP

(57) ABSTRACT

A water treatment device includes an inner canister or cylinder that includes a seal and a filter assembly attached on one end. The water treatment device also includes an outer canister which is filled with unpurified water. The inner canister or cylinder is pressed into the outer canister to produce pressure on unpurified water that forces the unpurified water through the filter assembly. The inner canister or cylinder can be opened to reveal drinkable, or substantially purified water.

20 Claims, 4 Drawing Sheets

(56) References Cited

U.S. PATENT DOCUMENTS

| | | |
|---|---|---|
| 5,636,437 A | 6/1997 | Kaschmitter et al. |
| 5,731,360 A | 3/1998 | Pekala et al. |
| 5,902,762 A | 5/1999 | Mercuri et al. |
| 5,932,185 A | 8/1999 | Pekala et al. |
| 5,954,937 A | 9/1999 | Farmer |
| 5,980,718 A | 11/1999 | Van Konynenburg et al. |
| 6,309,532 B1 | 10/2001 | Tran et al. |
| 6,346,187 B1 | 2/2002 | Tran et al. |
| 6,462,935 B1 | 10/2002 | Shiue et al. |
| 6,580,598 B2 | 6/2003 | Shiue et al. |
| 6,659,298 B2 | 12/2003 | Wong |
| 6,661,643 B2 | 12/2003 | Shiue et al. |
| 7,014,829 B2 | 3/2006 | Yanagisawa et al. |
| 7,138,042 B2 | 11/2006 | Tran et al. |
| 7,175,783 B2 | 2/2007 | Curran |
| 7,267,753 B2 | 9/2007 | Anex et al. |
| 7,459,121 B2 | 12/2008 | Liang et al. |
| 7,505,250 B2 | 3/2009 | Cho et al. |
| 7,600,567 B2 | 10/2009 | Christopher et al. |
| 7,706,128 B2 | 4/2010 | Bourcier |
| 7,761,809 B2 | 7/2010 | Bukovec et al. |
| 8,147,599 B2 | 4/2012 | McAlister |
| 8,361,321 B2 | 1/2013 | Stetson et al. |
| 2005/0189673 A1 | 9/2005 | Klug et al. |
| 2009/0294300 A1 | 12/2009 | Kanzius |
| 2010/0025330 A1 | 2/2010 | Ratto et al. |
| 2010/0127312 A1 | 5/2010 | Grebel et al. |
| 2010/0167551 A1 | 7/2010 | DeDontney |
| 2010/0323177 A1* | 12/2010 | Ruoff et al. .................. 428/220 |
| 2012/0048804 A1* | 3/2012 | Stetson et al. ............... 210/653 |
| 2012/0183738 A1 | 7/2012 | Zettl et al. |
| 2012/0255899 A1 | 10/2012 | Choi et al. |
| 2013/0105417 A1 | 5/2013 | Stetson et al. |
| 2013/0240355 A1 | 9/2013 | Ho et al. |
| 2013/0248367 A1 | 9/2013 | Stetson et al. |
| 2013/0249147 A1 | 9/2013 | Bedworth |
| 2013/0256210 A1 | 10/2013 | Fleming |
| 2013/0256211 A1 | 10/2013 | Fleming |
| 2013/0277305 A1 | 10/2013 | Stetson et al. |
| 2014/0261999 A1 | 9/2014 | Stetson et al. |
| 2014/0263035 A1 | 9/2014 | Stoltenberg et al. |
| 2014/0263178 A1 | 9/2014 | Sinton et al. |
| 2014/0272286 A1 | 9/2014 | Stoltenberg et al. |
| 2014/0377738 A1 | 12/2014 | Bachmann et al. |
| 2015/0075667 A1 | 3/2015 | McHugh et al. |

FOREIGN PATENT DOCUMENTS

| | | |
|---|---|---|
| WO | WO 2012/030368 | 3/2012 |
| WO | WO 2013/138137 | 9/2013 |

OTHER PUBLICATIONS

Bae et al. (Jun. 20, 2010) "Roll-to-roll production of 30-inch graphene films for transparent electrodes," *Nature Nanotechnology.* 5:574-578.

Cohen-Tanugi (Jun. 5, 2012) "Water Desalination across Nanoporous Graphene," *Nano Lett.* 12(7):3602-3608.

Jiang et al. (Dec. 9, 2009) "Porous Graphene as the Ultimate Membrane for Gas Separation," *Nano Letters.* 9:4019-4024.

Karan et al. (Jan. 27, 2012) "Ultrafast Viscous Permeation of Organic Solvents Through Diamond-Like Carbon Nanosheets," *Science.* 335:444-447.

Kim et al. (Mar. 1, 2010) "Fabrication and Characterization of Large-Area, Semiconducting Nanoperforated Graphene Materials," *Nano Letters.* 10:1125-1131.

Liu et al. (Jun. 9, 2008) "Graphene Oxidation: Thickness-Dependent Etching and Strong Chemical Doping," *Nano Letters.* 2008 8:1965-1970.

Mishra et al. (Jan. 13, 2011) "Functionalized Graphene Sheets for Arsenic Removal and Desalination of Sea Water," *Desalination.* 282:39-45.

Morse (Apr. 30, 2010) "Review of Kim et al. (Mar. 1, 2010) Fabrication and Characterization of Large-Area, Semiconducting Nanoperforated Graphene Materials," *InterNano Resources for Nanomanufacturing.*

Nair et al. (Jan. 27, 2012) "Unimpeded Permeation of Water Through Helium-Leak-tight tight Graphene-Based Membranes," *Science.* 335:442-443.

Paul (Jan. 27, 2012) "Creating New Types of Carbon-Based Membranes," *Science.* 335:413-414.

Sint et al. (Nov. 14, 2008) "Selective Ion Passage through Functionalized Graphene Nanopores," *J. Am. Chem. Soc.* 130(49):16448-16449.

Suk et al. (Apr. 30, 2010) "Water Transport Through Ultrathin Graphene," *Journal of Physical Chemistry Letters.* 1(10):1590-1594.

Zyga (Jun. 22, 2012) "Nanoporous Graphene Could Outperform Best Commercial Water Desalination Techniques," Phys.org. http://www.phys.org/pdf259579929.pdf. [Last Accessed Dec. 3, 2014].

* cited by examiner

SYSTEM AND METHOD FOR WATER PURIFICATION AND DESALINATION

RELATED APPLICATION

This application claims the benefit of U.S. Provisional Patent Application Ser. No. 61/507,423, filed on Jul. 13, 2011, which is incorporated by reference herein.

TECHNICAL FIELD

Various embodiments described herein relate to a system and a method for for water purification and desalination. A filter assembly includes a semipermeable membrane which is supported by other structural portions.

BACKGROUND

Water may contain many different kinds of contaminants including, for example, particulates, harmful chemicals, and microbiological organisms, such as bacteria, parasites, protozoa, and viruses. In a variety of circumstances, these contaminants must be removed before the water can be used. Any harmful contaminants must be removed from water before it is potable, i.e., fit for human consumption.

In many instances, there are deadly consequences associated with exposure to contaminated water. In many situations, such as an undeveloped country or a war zone, there are several factors that contribute to contaminated water, including: increasing population densities, increasingly scarce water resources, no water filter utilities, and often, no electricity (including batteries, which may be too expensive). Also, it is common for sources of drinking water to be in close proximity to human and animal waste, such that microbiological contamination is a major health concern. As a result of waterborne microbiological contamination, an estimated six million people die each year, half of which are children under 5 years of age.

In 1987, the U.S. Environmental Protection Agency (EPA) introduced the "Guide Standard and Protocol for Testing Microbiological Water Purifiers". The protocol establishes minimum requirements regarding the performance of drinking water filter devices that are designed to reduce specific health related contaminants in public or private water supplies. The requirements are that the effluent from a water supply source exhibits 99.99% (or equivalently, 4 log) removal of viruses and 99.9999% (or equivalently, 6 log) removal of bacteria against a challenge. Under the EPA protocol, in the case of viruses, the influent concentration should be $1 \times 10^7$ viruses per liter, and in the case of bacteria, the influent concentration should be $1 \times 10^8$ bacteria per liter. Because of the prevalence of *Escherichia coli* (*E. coli*, bacterium) in water supplies, and the risks associated with its consumption, this microorganism is used as the bacterium in the majority of studies. Similarly, the MS-2 bacteriophage (or simply, MS-2 phage) is typically used as the representative microorganism for virus removal because its size and shape (i.e., about 26 nm and icosahedral) are similar to many viruses. Thus, a filter's ability to remove MS-2 bacteriophage demonstrates its ability to remove other viruses.

In undeveloped countries, disaster areas, and in war zones, the water sources may include seawater, rivers, streams, lakes, ponds, ground water, indigenous wells, or sub-standard municipal water. Good water sources may go bad leaving inadequate sources of water or the sources of water may never have been good.

People in these situations may not be educated and may not have shelter, much less a home or place to store a device. Today's solutions seem to be rather large and complex to use. Most solutions purify 5-10 gallons of water and require the user to carry a large container as well as a heavy mechanism which is used to purify water. Individuals probably would not carry a filtration system with an attached 10 gallon water canister in such situations. As a result of not carrying the big solution, many times the individuals in effected areas will drink unpurified water when thirsty, thereby increasing the chances of sickness or even death from unpotable water.

In addition, many solutions require a power source. In a disaster situation or in a war zone, power may not be available. In addition, battery power can be used, however batteries often do not last for a long time and may discharge before the disaster is over or before a soldier or unit of soldiers leaves the area or can find power. Such solutions are heavier, since batteries are not light. This solution also requires a rescue worker, soldier, or unit of soldiers to carry additional batteries. Without batteries, these water purification devices are generally useless. This again leads to people drinking unpotable water is certain situations.

SUMMARY OF THE INVENTION

In such situations, the water treatment device needs to be simple to use and small enough for an individual to carry. Military personnel also need a similar device. One that can be carried by an individual and is simple to operate and having the capability of purifying from 1 to 10 gallons of water per hour. In either case, the capability to remove suspended solids, dissolved salts, and micro-organisms is desirable so that the unit can be used in any of a full range of water sources.

A water treatment device includes an inner aluminum cylinder that includes a seal and a filter on one end. The water treatment device also includes an outer canister which is filled with unpurified water. The inner aluminum cylinder is pressed into the canister. This forces the unfiltered water through the filter and into the aluminum cylinder. The aluminum cylinder can be opened to reveal drinkable, or substantially purified water.

DETAILED DESCRIPTION

Figure 1:
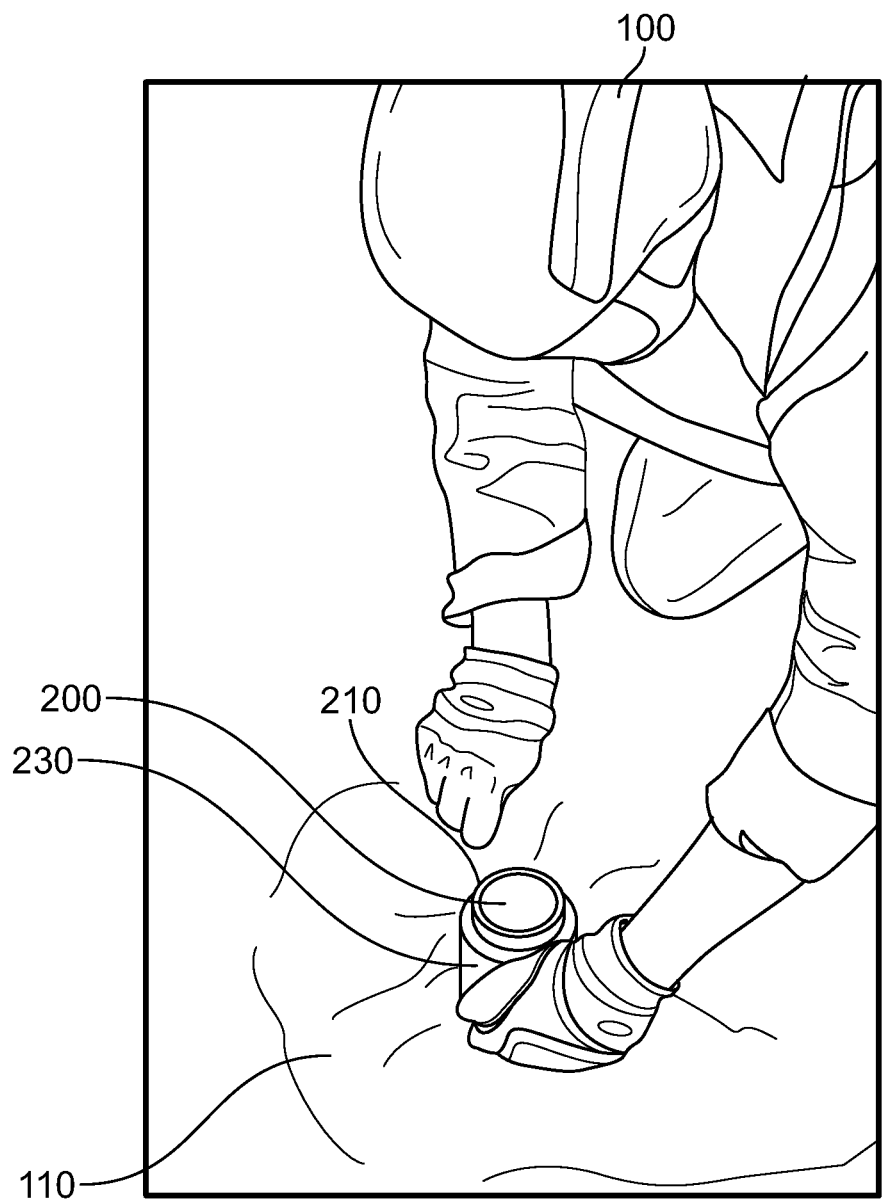
FIG. 1 is a top view of a military person using the water treatment and desalination device disclosed herein, according to an example embodiment.

FIG. 1 is a top view of a military person 100 using the water treatment and desalination device 200 disclosed herein, according to an example embodiment. The military person 100 has found a less than pure source of water 110. The source of water 110 includes suspended solids, like dirt and clay, as well as viruses and bacteria. In some situations the source of water may include *Escherichia coli* (*E. coli*). In addition, the source of water may also include salt or various salts. Each of these and others will make the water of the water source 110 unpotable or unfit for human consumption. By consuming such water a human runs the risk of getting very sick or may even risk dying. The water treatment and desalination device 200 or a portion of the water treatment and desalination device 200 is placed into the water source. Specifically, the outer canister 230 (discussed in more detail in the discussion of FIG. 2) is placed in the water source. The soldier or military person fills the outer canister 230 with water from the water source that will be treated using the water treatment and desalination device 200 so that the water obtained is potable or fit for human consumption. In FIG. 1, the outer canister 230 is shown with the inner canister 210 placed within the outer canister 230.

Figure 2:
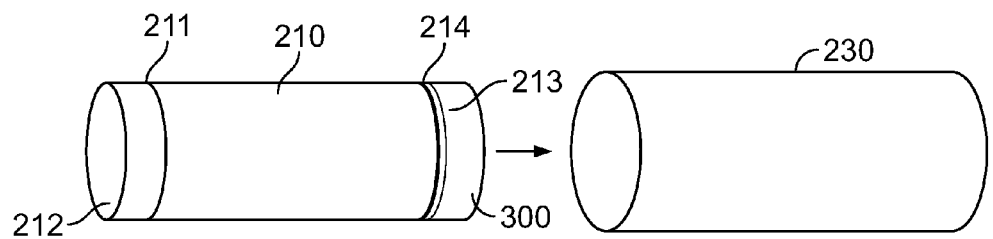
FIG. 2 is an exploded view of the system water purification and desalination, according to an example embodiment.

FIG. 2 is an exploded view of the system water purification and desalination 200, according to an example embodiment. The water treatment and desalination device 200 includes an inner canister 210 having a lid 212 on one end and a filter assembly 220 on the other end. The water treatment and desalination device 200 also includes an outer canister 230. The inner canister 210 fits within the outer canister 230.

The inner canister 210 includes a lid end 211 and a filter end 213. The inner canister 210 also includes a lid 212. The lid 212 securely attaches to the lid end 211 of the inner canister 210. The lid 210 and the inner canister 210 can be made of aluminum or other lightweight material that is tough and durable yet lightweight. In one embodiment, the lid 212 includes a set of threads and the inner canister includes another set of threads. The lid 212 threadably engages the lid end 211 of the inner canister 210. When the lid 212 is attached to the inner canister 210, there is a volume formed within the inner canister 210 for clean or substantially purified, potable water. When the lid 212 is attached to the inner canister 210, the canister 210 and lid 212 form a substantially leakproof volume to capture or hold the potable water. To that end, some embodiments may include may be one or more seals (not shown) between the lid 212 and the end of the inner canister 210. The seals can be of any type including a rubber or other elastomeric material. The seal material must be hard enough to be durable yet soft enough to provide a seal. In some embodiments, there can be multiple seals between the lid 212 and the inner canister 210.

The inner canister 210 also includes a seal system 214 near the filter end 213 of the inner canister 210. The seal system 214 is positioned around the cylindrical surface of the inner canister 210. The seal system 214 acts like a piston ring in an engine. The seal system 214 seals the gap between the outer surface of the inner canister 210 and the inner surface of the outer canister 230. As shown in FIG. 2, the seal includes a single ring 214. In one embodiment, the ring 214 is made of an elastomeric material such as rubber or a silicone material. Polymeric materials or plastics could also be used. Generally, the durometer readings associated with the material must be high enough so that the material will wear for an elected amount of time. The elastomeric material must also have a low enough reading so that the seal will actually conform to the surface of the inner canister 210 and the outer canister 230 and form a seal. The seal must substantially prevent liquid captured between the inner canister 210 and the inside of the outer canister 230 from passing the seal system 214 between the outer surface of the inner canister 210 and the inner surface of the outer canister 230. In some embodiments, the seal system 214 includes a single seal. In other embodiments, the seal system 214 can include multiple seals. As shown in FIG. 2, the seal of the seal system 214 is an O-ring. In other embodiments the seal may have a different cross-sectional shape.

Figure 3:
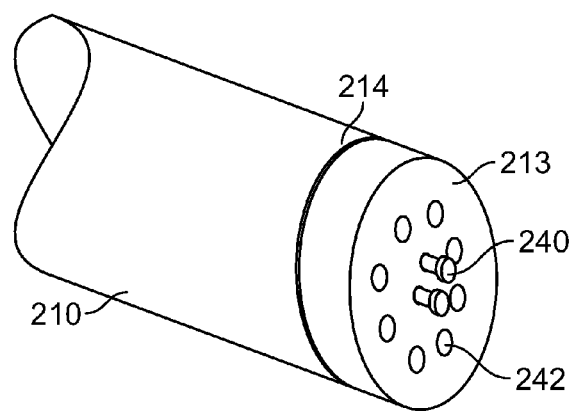
FIG. 3 is a perspective view of the filter end of the inner canister, with the filter assembly removed, according to an example embodiment.

FIG. 3 is a perspective view of the filter end 213 of the inner canister 230, with the filter assembly 400 removed, according to an example embodiment. The filter end 213 of the inner canister 230 includes a portion of an attachment mechanism 240 and a plurality of openings 242 therein. The portion of the attachment mechanism 240 is for attaching the filter assembly 400 to the end of the inner canister 230. The attachment mechanism can be any sort of attachment mechanism that does not substantially obstruct the openings 242 in the filter end 213. The attachment portion 240 includes a plurality of posts having upset ends which mate with another portion of the attachment mechanism associated with the filter assembly 400. The seal system 214 also includes a seal around the periphery of the filter end 213 of the inner canister 210. The seal system keeps filtered fluid from flowing into the volume between the inner canister 210 and the outer canister 230 (where unfiltered water is present). The seal system 214 also keeps the unfiltered water from being introduced into the filtered water stream passing from the filter assembly 400 and through the openings 242 and into the inner canister 210 (where filtered water resides).

Figure 4:
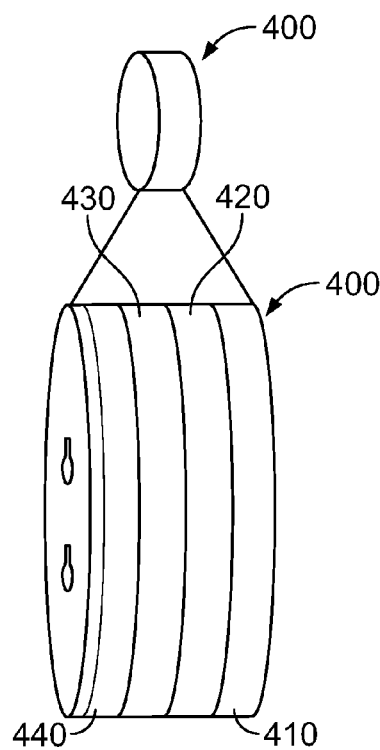
FIG. 4 is a perspective view of a filter assembly associated with the water treatment and desalination device, according to an example embodiment.

FIG. 4 is a perspective view of a filter assembly 400 associated with the water treatment and desalination device 200, according to an example embodiment. The filter assembly 400 is multilayered. The layers include a prefilter screen 410 for removing large solids from the unfiltered water. The prefilter screen 410 can be made of one screen or multiple screens. The layers also include a porous support layer 420. The porous ceramic layer 420 further filters the water. The ceramic layer 420 also serves another purpose, namely, that of supporting a semi-permeable membrane 430 used to filter viruses, bacteria, and salt from the unfiltered water. In some instances, this layer can be very thin. For example, in some instances the layer may be only one atom in thickness. The layers also include a second a porous support layer 440. This porous support layer 440 allows filtered water to pass and provides support for the semi-permeable membrane 430. Essentially, the semi-permeable membrane 430 is sandwiched between porous support layers 420 and 440. The filter assembly also includes an attachment layer 450 that includes an attachment portion 451 that can mate and securely attach to the attachment portion 240 of the filter end 213 of the inner canister 210. The attachment portion also includes pores or openings 542 that allow fluid to pass the attachment layer 450 of the filter assembly. As shown, the attachment layer 450 is separate from the support layer 440. It should be noted that in some embodiments, the attachment layer 450 and the support layer 440 could be integrated into a single layer. In the embodiment shown in FIG. 4, the first porous support layer 420 and the second porous support layer 440 are porous ceramic. The first and second support layers 420, 440 are made of the same material so that the support layers expand and contract substantially the same in response to different conditions being encountered. In another embodiment, the first and second support layers 420, 440 could be made of different materials. Generally, the water to be filtered will be in a fairly narrow range of temperatures and so any difference in the thermal coefficient of expansion will be insignificant. Of course, if materials are different, it would be wise to try and match or get thermal coefficients of expansion as close as possible to minimize the chance of such issues.

The semi-permeable membrane layer 430 can be any type of semi-permeable membrane material. In one embodiment, a thin film composite membrane (TFC or TFM) is used. The TFC or TFM membrane uses a process referred to as reverse osmosis to remove bacteria, viruses, salt and other contaminants from unfiltered or partially filtered liquids, such as water. These are semipermeable membranes manufactured principally for use in water purification or desalination systems. In essence, a TFC material is a molecular sieve constructed in the form of a film from two or more layered materials. Membranes used in reverse osmosis are, in general, made out of polyimide, chosen primarily for its permeability to water and relative impermeability to various dissolved impurities including salt ions and other small molecules that cannot be filtered. Other membranes can also be used including cellulose ester membrane (CEM), charge mosaic membrane (CMM), bipolar membrane (BPM), anion exchange membrane (AEM), alkali anion exchange membrane (AAEM) and proton exchange membrane (PEM).

As shown in FIG. 4, the layer 430 of membrane material includes at least one layer of graphene. Graphene is an allotrope of carbon, whose structure is one-atom-thick planar sheets of $sp^2$-bonded carbon atoms that are densely packed in a honeycomb crystal lattice. Graphene is most easily visualized as an atomic-scale chicken wire made of carbon atoms and their bonds. The crystalline or "flake" form of graphite consists of many graphene sheets stacked together. The carbon-carbon bond length in graphene is about 0.142 nanometers. Graphene sheets stack to form graphite with an interplanar spacing of 0.335 nm, which means that a stack of 3 million sheets would be only one millimeter thick. As shown in FIG. 4, the graphene layer can be any number of layers thick, including a single layer in thickness. The graphene acts as a sieve that is small enough to let water pass but is too small to let other materials pass, such as viruses and bacteria. In one embodiment, graphene is grown to produce the semi-permeable membrane material. In another embodiment, the graphene will be perforated with 1 nm-50 nm openings. These openings gives the graphene a semi-permeable nature. Without the openings, the grapheme would be impermeable.

Figure 5:
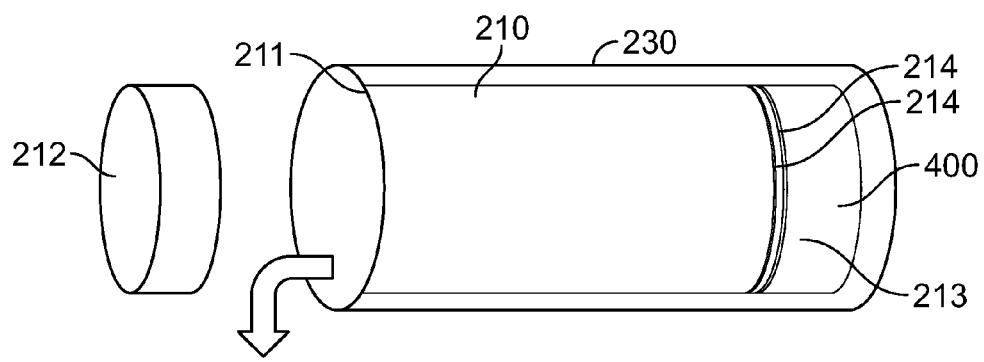
FIG. 5 is a perspective view of the water treatment and desalination device with the inner canister within the outer canister, according to an example embodiment of the invention.

FIG. 5 is a perspective view of the water treatment and desalination device after the inner canister 210 has been inserted into the outer canister 230, according to an example embodiment of the invention. The inner canister 210 fits within the outer canister 230. The inner canister 210 is carefully fit into the outer canister 230 and pushed into the outer canister 230. This can be done when the system water purification and desalination 200 is not being used. When not used, the lid 212 is also generally attached to the lid end 211 of the inner canister 210. The inner canister 210 is also be forced into the outer canister 230 when the outer canister 230 is filled or contains unfiltered water. The lid 212 will be attached to the lid end 211 of the inner canister 210 to contain the filtered water for later use.

Figure 6:
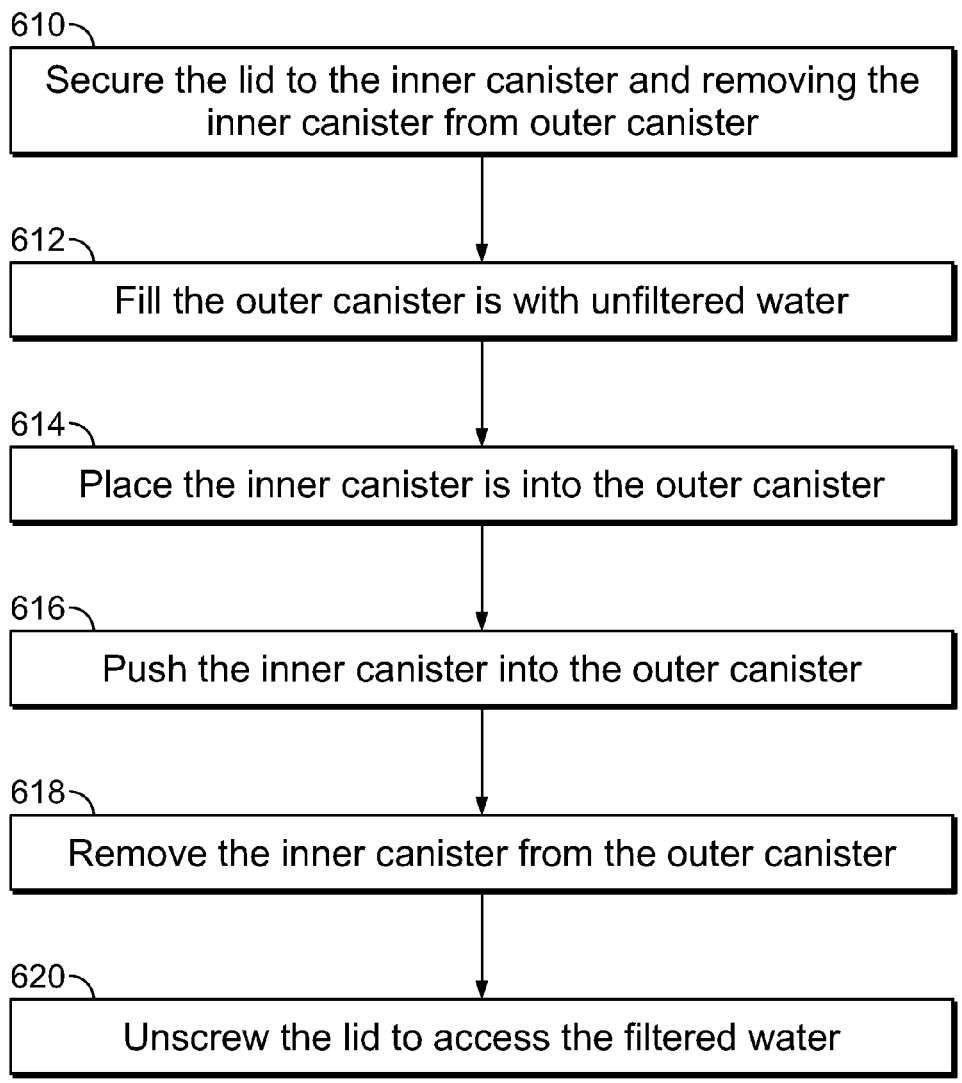
FIG. 6 is a flow chart for the method of using the water treatment and desalination device, according to an example embodiment.

FIG. 6 is a flow diagram for the method 600 of use of the system water purification and desalination 200, according to the example embodiment. The method 600 includes securing the lid to the inner canister and removing the inner canister from outer canister 610. The outer canister is then filled with unfiltered water 612. The outer canister 210 is typically not filled all the way to the top, but is filled about 80% full. Filling the outer canister 210 to the top will would be too much water. As a result, the outer er canister 210 is filled not quite to the top to accommodate all the water in the smaller inner canister 210. After partially filing the outer canister 230, the inner canister 210 is placed into the outer canister 614. The inner canister is then pushed into the outer canister 616. Pushing the inner canister by hand into the outer canister produces sufficient pressure to force the unfiltered water through the filter assembly 400. The seal system 214 keeps the water in the outer canister as pressure is being applied. The seal system 214 also will prevent flow of unfiltered water between the filter assembly 400 and the unfiltered water surrounding the filter end 213 of the inner canister 210. The inner canister 210 is pushed until substantially fully inserted into the outer canister 230. The filtered water will be within the inner canister. The inner canister can be removed 618, and the lid can be unscrewed to access the filtered water 620.

In one embodiment, the inner canister includes a shut off to keep the water in. In the alternative, the inner canister includes substantially one way valves positioned near the openings in the filter end 213.

A water purification and desalination device includes a flow path for water and a graphene material positioned within the flow path. The device also includes a container for containing the water after is has passed through the graphene material. The graphene material is at least one atomic layer in thickness of graphene. In some embodiments, the graphene material is one-atom-thick planar sheets of $sp^2$-bonded carbon atoms that are densely packed in a honeycomb crystal lattice. In another embodiment, the graphene material includes a plurality of atomic layers of graphene material. In some embodiments, the graphene sheets having an interplanar spacing in a range of 0.300 nm to 0.3705 nm. In still other embodiments, the graphene sheets having an interplanar spacing of approximately 0.335 nm. The graphene material can be associated or part of a membrane of material. The graphene material is situated in the flow path so that the water that enters the container passes through the graphene material. In still other embodiments, the graphene material is perforated and has openings therein, the openings within the range of 1 nm-50 nm.

A water purification and desalination device includes a first container having a sealable end and a membrane end, and a second container having a closed end and an open end. The first container fits within the second container. The device includes a seal positioned between the exterior of the first container and the interior of the second container to force water in the second container through the membrane end of the first container. The membrane filters out impurities in the water. In one embodiment, the membrane includes at least one layer of graphene material. In another embodiment, the membrane includes a plurality of layers of graphene material. The interlayer spacing between layers of graphene material can be in the range of 300 nm to 370 nm. In some embodiments, one or more layers of graphene material can include perforations therein.

A method of purifying water includes placing a graphene material in a fluid flow path, and passing water from a source through the graphene material to remove contaminants from the water. Placing a graphene material in a fluid flow path includes poviding an inner canister with a closed end and a membrane end, the graphene material associated with the membrane end, and passing water from an outer canister through the membrane end of the inner container. The inner canister sealing engages and fits within the outer canister. Passing water from an outer canister to an inner canister includes pushing the inner canister into an outer canister containing at least some water.

It should be noted that hand pressure is one way of producing the appropriate amount of pressure in the filtering and desalinating system 200. In other embodiments, this may be too uncontrolled so other types of pressurization systems can be used, including hand pumps or similar pressurizing systems. These types of pressurizing systems may be needed to deliver a more even pressure to the filter assembly 400 during the filtration process.

The embodiments described above meet a need for energy efficient, small scale, water treatment and purification at an individual or squad level. The embodiments also are lightweight, hand carried, low power water purification devices. The embodiments described above also have the capability to purify water at a rate ranging from 1 to 10 gallons per hour. It should be noted that typical water sources encountered during expeditionary, military, or other operations include seawater, rivers, streams, lakes, ponds, ground water, indigenous wells, or sub-standard municipal water. The embodiments described are capable of removing suspended solids, dissolved salts, and micro-organisms from the full range of potential water sources mentioned previously.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which shows by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A device for purification of water, the device comprising:
    a first container having a sealable end, a filter end and an exterior surface;
    a filter assembly attached to the filter end of the first container, the filter assembly comprising a semi-permeable membrane and two porous support layers, wherein the semi-permeable membrane includes at least one layer of graphene having perforations therein and the semi-permeable membrane is sandwiched between the porous support layers;
    a second container having a closed end, an open end and an interior surface, the first container fitting within the second container; and
    a seal positioned between the exterior surface of the first container and the interior surface of the second container to force water in the second container through the filter end of the first container.

2. The device of claim 1 wherein the semi-permeable membrane filters out impurities in the water.

3. The device of claim 1 wherein the semi-permeable membrane includes a plurality of layers of graphene.

4. The device of claim 1 wherein the semi-permeable membrane includes a plurality of layers of graphene having an interlayer spacing in the range of 300 nm to 370 nm.

5. A method of purifying water comprising:
    (1) providing a device having:
        a first container having a sealable end, a filter end and an exterior surface;
        a filter assembly attached to the filter end of the first container, the filter assembly comprising a semi-permeable membrane and two porous support layers, wherein the semi-permeable membrane includes at least one layer of graphene having perforations therein and the semi-permeable membrane is sandwiched between the porous support layers;
        a second container having a closed, an open end and an interior surface, the first container fitting within the second container; and
        a seal positioned between the exterior surface of the first container and the interior surface of the second container to force water in the second container through the filter end of the first container
    (2) passing water from the second container through the filter end of the first container to remove contaminants from the water.

6. The method of claim 5 wherein the seal engages with and fits within the second container and wherein passing water from the second container through the filter end of the first container includes pushing the first container into the second container, wherein the second container contains at least some water.

7. The device of claim 2, wherein the semi-permeable membrane is permeable to water, but not to dissolved salts.

8. The device of claim 2 wherein the semi-permeable membrane is permeable to water, but not to viruses.

9. The device of claim 8, wherein the semi-permeable membrane is permeable to water, but not to MS-2 bacteriophage.

10. The device of claim 2, wherein the semi-permeable membrane is permeable to water, but not to bacteria.

11. The device of claim 10, wherein the semi-permeable membrane is permeable to water, but not to *Escherichia coli*.

12. The device of claim 2, wherein the semi-permeable membrane is permeable to water, but not to dissolved salts.

13. The device of claim 12, wherein the dissolved salt is dissolved sodium chloride.

14. The device of claim 1, wherein the perforations are within the range of 1 nm-50 nm.

15. The device of claim 1, wherein the porous support layers are porous ceramic layers.

16. The device of claim 1, wherein the filter assembly further comprises a prefilter screen.

17. The device of claim 1, further comprising an attachment mechanism for attaching the filter assembly to the filter end of the first container.

18. The device of claim 1, wherein the filter end of the first container further includes a plurality of holes.

19. The device of claim 1, wherein the porous support layers are of different materials.

20. The device of claim 19, wherein one of the materials is a ceramic material.

* * * * *